US011803524B1

(12) United States Patent
Dwarakanath et al.

(10) Patent No.: US 11,803,524 B1
(45) Date of Patent: Oct. 31, 2023

(54) STREAMLINED DATABASE MIGRATION WITH STORED PROCEDURE EXTRACTION INTO ON-DEMAND EXECUTION ENVIRONMENTS

(71) Applicant: Amazon Technologies, Inc., Seattle, WA (US)

(72) Inventors: Samvid H. Dwarakanath, Seattle, WA (US); Sean Oczkowski, Seattle, WA (US); Rory Richardson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 16/834,944

(22) Filed: Mar. 30, 2020

(51) Int. Cl.
*G06F 16/21* (2019.01)
*G06F 16/242* (2019.01)
*H04L 67/56* (2022.01)
*G06F 16/2455* (2019.01)

(52) U.S. Cl.
CPC .......... *G06F 16/214* (2019.01); *G06F 16/219* (2019.01); *G06F 16/2448* (2019.01); *H04L 67/56* (2022.05); *G06F 16/24564* (2019.01)

(58) Field of Classification Search
CPC .. G06F 16/214; G06F 16/219; G06F 16/2448; G06F 16/24564; H04L 67/28; H04L 67/56

See application file for complete search history.

(56) References Cited

U.S. PATENT DOCUMENTS

| | | | | |
|---|---|---|---|---|
| 9,996,562 | B2 * | 6/2018 | Higginson | G06F 16/214 |
| 2005/0144277 | A1 * | 6/2005 | Flurry | H04L 67/2819 |
| | | | | 709/225 |
| 2005/0149537 | A1 * | 7/2005 | Balin | G06F 16/214 |
| 2005/0256892 | A1 * | 11/2005 | Harken | G06F 16/254 |
| 2010/0153341 | A1 * | 6/2010 | Driesen | G06F 16/214 |
| | | | | 707/661 |
| 2014/0208290 | A1 * | 7/2014 | McGillin | G06F 8/51 |
| | | | | 717/106 |
| 2014/0222756 | A1 * | 8/2014 | Schmidt | G06F 16/258 |
| | | | | 707/610 |
| 2017/0046143 | A1 * | 2/2017 | Kochhar | G06F 8/60 |
| 2017/0329770 | A1 * | 11/2017 | Kozak | G06F 16/258 |
| 2018/0246886 | A1 * | 8/2018 | Dragomirescu | G06F 16/214 |
| 2018/0284999 | A1 * | 10/2018 | Aslam | G06F 3/067 |
| 2018/0293233 | A1 * | 10/2018 | Higginson | G06F 16/214 |
| 2018/0329782 | A1 * | 11/2018 | Kludy | G06F 11/1402 |
| 2020/0167323 | A1 * | 5/2020 | Swamy | G06F 16/256 |
| 2021/0209098 | A1 * | 7/2021 | Shi | G06F 16/2452 |

\* cited by examiner

*Primary Examiner* — Pierre M Vital
*Assistant Examiner* — Andrew N Ho
(74) *Attorney, Agent, or Firm* — Nicholson De Vos Webster & Elliott LLP

(57) ABSTRACT

Techniques for streamlined database migration with stored procedure extraction into on-demand execution environments are described. A stored procedure of a first database is obtained and a code segment corresponding to the stored procedure is deployed as a function of an on-demand code execution service. A client application may directly execute the stored procedure by issuing a call to the on-demand code execution service to invoke the function, or by issuing a request to execute the stored procedure that is intercepted by a database proxy, which services the request by invoking the function on the client application's behalf.

20 Claims, 11 Drawing Sheets

STORED PROCEDURE MIGRATION

THE FOLLOWING STORED PROCEDURES WERE IDENTIFIED IN THE SOURCE DATABASE. PLEASE INDICATE HOW THESE STORED PROCEDURES SHOULD BE MIGRATED, IF AT ALL:

| MIGRATE TO TARGET DB | MIGRATE TO ON-DEMAND EXECUTION SERVICE | DO NOT MIGRATE | STORED PROCEDURE |
|---|---|---|---|
| ● | ○ | ○ | VALIDATE_USER_ROLES |
| ● | ○ | ○ | VALIDATE_MANAGER_EMPLOYEES |
|   | ● | ○ | GENERATE_INVENTORY_REPORT ✗ UNABLE TO BE MIGRATED TO TARGET DATABASE |
|   | ○ | ● | ANALYZE_EMPLOYEE_HIRE_INFO ✗ UNABLE TO BE MIGRATED TO TARGET DATABASE |
| ○ | ● | ○ | CHECK_EMPLOYEE_RECORDS |
| ● | ○ | ○ | UPDATE_LOGS |

[ CANCEL ]   [ NEXT ]

*FIG. 2*

```
CREATE OR REPLACE PROCEDURE
EMP_SALARY_INCREASE
(EMP_ID IN EMPTBL.EMPID%TYPE,
SALARY_INC IN OUT EMPTBL.SALARY%TYPE)
IS
  TMP_SAL NUMBER;
BEGIN
  TMP_SAL := 2;

LOOP
    TMP_SAL := TMP_SAL*2;
    EXIT WHEN TMP_SAL > 10000;
  END LOOP;

IF TMP_SAL > 55 THEN
    TMP_SAL := 1;
  END IF;

SALARY_INC := TMP_SAL;
END;
```
305

```
{
  "NAME": "EMP_SALARY_INCREASE",
  "PARAMETERS": [
    {
      "INOUT": "IN",
      "NAME": "EMP_ID",
      "TYPE": "EMPTBL.EMPID%TYPE"
    },
    {
      "INOUT": "INOUT",
      "NAME": "SALARY_INC",
      "TYPE": "EMPTBL.SALARY%TYPE"
    }
  ],
  "ASM": [
    "EMP_ID@1@0 SALARY_INC@2@0 TMP_SAL@3@0 | SET TMP_SAL@3@0 2",
    "EMP_ID@1@0 SALARY_INC@2@0 TMP_SAL@3@0 | SET TMP_SAL@3@0 TMP_SAL@3@0*2",
    "EMP_ID@1@0 SALARY_INC@2@0 TMP_SAL@3@0 | JUMP_IF_NOT 4(0) TMP_SAL@3@0 > 10000",
    "EMP_ID@1@0 SALARY_INC@2@0 TMP_SAL@3@0 | JUMP 5(0) ",
    "EMP_ID@1@0 SALARY_INC@2@0 TMP_SAL@3@0 | JUMP 1(0) ",
    "EMP_ID@1@0 SALARY_INC@2@0 TMP_SAL@3@0 | JUMP_IF_NOT 8(0) TMP_SAL@3@0 > 55",
    "EMP_ID@1@0 SALARY_INC@2@0 TMP_SAL@3@0 | SET TMP_SAL@3@0 1",
    "EMP_ID@1@0 SALARY_INC@2@0 TMP_SAL@3@0 | JUMP 8(0) ",
    "EMP_ID@1@0 SALARY_INC@2@0 TMP_SAL@3@0 | SET SALARY_INC@2@0 TMP_SAL@3@0"
  ]
}
```
310

```
private static final String JDBC_URL = "jdbc:mysql://" + DATABASE_INSTANCE_HOSTNAME
+ ":" + DATABASE_INSTANCE_PORT;
```

510

```
private static final String JDBC_URL = "jdbc:mysql://" + DBPROXY_DNS_NAME + ":" +
DBPROXY_PORT;
```

705

```
if (!$mysqli->query("CALL myStoredProcedure(1)")) {
    echo "CALL failed: (" . $mysqli->errno . ") " . $mysqli->error;
}
```

710

```
$client = $this->sdk->createClient('serverless',$region);

$result = $client->invoke(array(
    'FunctionName' => 'myStoredProcedure',
    'InvocationType' => 'RequestResponse',
    'Payload' => json_encode(array("1")),
));
```

STREAMLINED DATABASE MIGRATION WITH STORED PROCEDURE EXTRACTION INTO ON-DEMAND EXECUTION ENVIRONMENTS

BACKGROUND

Many different types of entities store data in databases. Databases provide an organized collection of data and include schemas, tables, queries, reports, views and other objects. There are many different database management systems ("DBMS") available for use that create and manage databases. Customers may use different schema and code, including views, stored procedures and functions, to interact with databases. In some cases, an entity may want to migrate data from one database to another. For example, a company may want new or different features associated with a particular type of database and/or the company may want to transition the database to an off-premise network.

In some cases, it can be very difficult and time-consuming to migrate data between different databases. For example, the source database and a target database may use different schemas, different formats for schema objects, as well as different syntax and language structures for the code used in stored procedures and functions. Converting these objects used by the source database into a format that is compatible with the target database can be very expensive and time consuming. For example, many organizations with legacy databases have slowly added application code into their databases in the form of stored procedures. As a result, this code can be quite significant in size, and can span tens of thousands of lines of code or more. Thus, analyzing and rewriting this code according to a new stored procedure language specification can require a substantial effort and lead to the introduction of bugs, and this alone may prevent organizations from choosing to migrate their databases at all.

BRIEF DESCRIPTION OF DRAWINGS

Various embodiments in accordance with the present disclosure will be described with reference to the drawings, in which:

FIG. 2 is a diagram illustrating an exemplary user interface of provided by a schema conversion tool or migration service console as part of streamlined database migration with stored procedure extraction into on-demand execution environments according to some embodiments.

FIG. 3 is a diagram illustrating code for an exemplary stored procedure supported by a first type of database and a data structure including an intermediate representation of the stored procedure that can be useful for streamlined database migration with stored procedure extraction into on-demand execution environments according to some embodiments.

DETAILED DESCRIPTION

Figure 1:
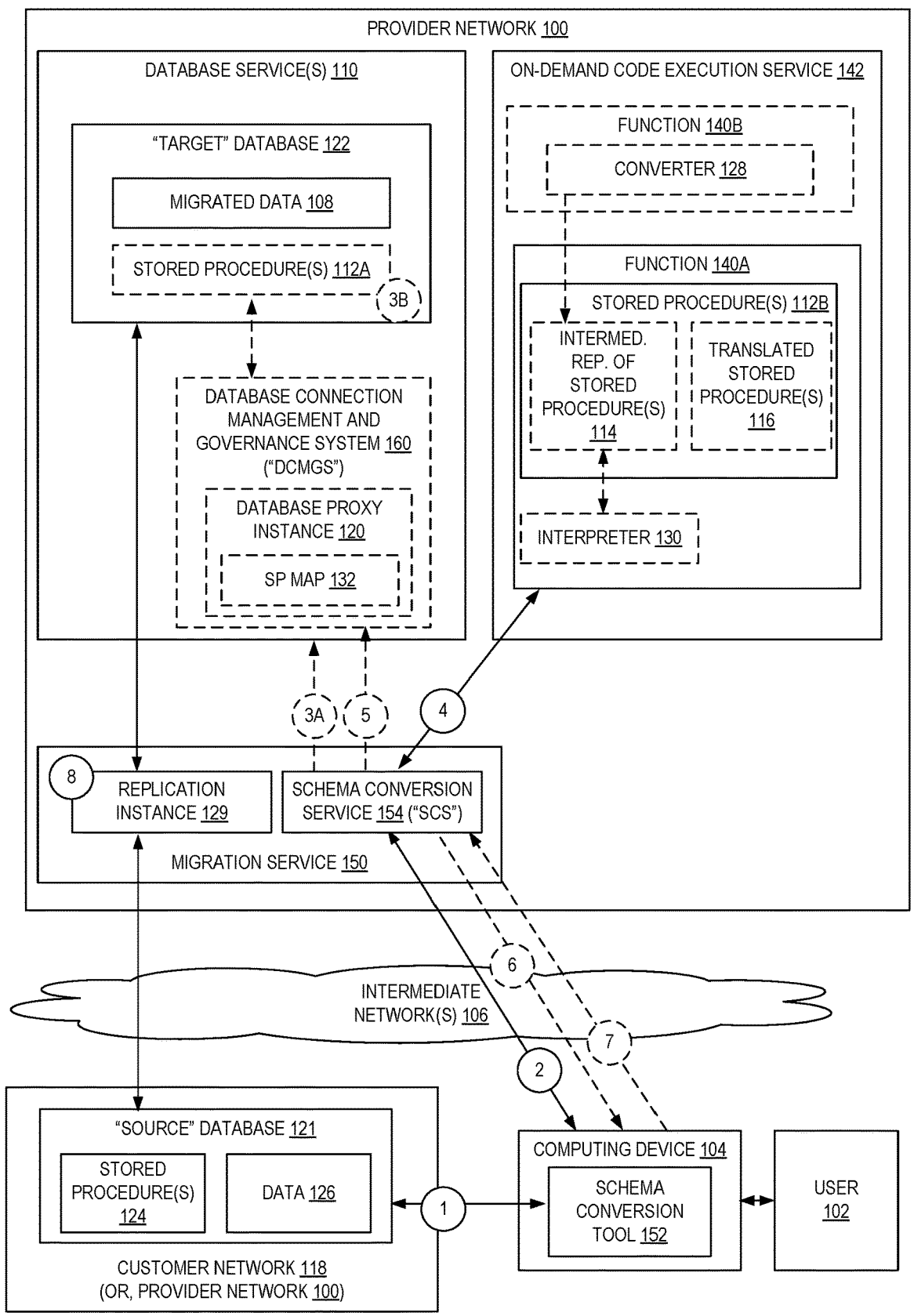
FIG. 1 is a diagram illustrating an environment for streamlined database migration with stored procedure extraction into on-demand execution environments according to some embodiments.

The present disclosure relates to methods, apparatus, systems, and non-transitory computer-readable storage media for streamlined database migration with stored procedure extraction into on-demand execution environments. According to some embodiments, a set of one or more stored procedures of a database can be obtained and deployed as functions of an on-demand code execution service of a multi-tenant provider network. Client applications can be adapted to directly call the functions, or a database proxy may be utilized that can identify stored procedure execution requests intended for the database and intelligently re-route these requests to the corresponding functions.

The deployment of stored procedures may be part of a database migration, such as from a database of a first vendor or developer to a database of another developer. In some such embodiments, a source database—which may be within or external to the provider network—may be migrated to a target database implemented within the provider network. In some scenarios, the source language of the stored procedure(s) may not be understood by the target database, and in some scenarios, certain stored procedure constructs or commands used by the stored procedure of the source database may not have analogues within the stored procedure language supported by the target database. Beneficially, techniques described herein can perform stored procedure migration without requiring extensive stored procedure re-writes commonly performed by engineers when performing such migrations.

The set of stored procedures may include one, some, or all of the stored procedures of the database, and in some embodiments a user tasked with migrating the database may select which ones of the stored procedures are to be deployed as on-demand functions in this manner, which of the stored procedures are to be migrated to the target database, and/or which of the stored procedures are not to be migrated in any form. Beneficially, embodiments providing users this type of control can allow the users themselves to decide the best place for a stored procedure on a case-by-case basis—whether it is "close" to the data an implemented as a stored procedure within the target database, or whether it is "unbundled" from the database in a more scalable, visible, and/or maintainable environment.

In some embodiments, the code for a stored procedure is obtained and translated into an intermediate representation (e.g., an assembly-like format), which can be interpreted by the on-demand code execution service for invocation requests. The stored procedure may also be translated into a general-purpose programming language, which may be interpreted, or compiled and executed, etc. The stored procedure may, in some embodiments, be obtained in a compiled form from the source database itself and deployed in this compiled form, or may be converted into a data structure such as an abstract syntax tree that itself can be interpreted for an invocation request.

Accordingly, users with legacy databases can more easily migrate to use more modern (or simply different) databases in a "lift-and-shift" manner without slow, difficult, expensive, and often bug-inducing nature of rewriting and migrating stored procedures into a new stored procedure language/dialect.

FIG. 1 is a diagram illustrating an environment for streamlined database migration with stored procedure extraction into on-demand execution environments according to some embodiments. FIG. 1 illustrates a schema conversion service 154 that may operate as part of a migration service 150 that performs database migration, e.g., from a customer network 118 into a provider network 100 (e.g., managed by a database service 110), from a provider network 100 to a customer network 118, from one database in a provider network 100 to another in the provider network 100, etc. The schema conversion service 154 may operate, as described herein, to deploy stored procedures of a database to functions 140 of an on-demand code execution service 142. These illustrated or discussed components, such as the migration service 150, schema conversion service 154, database service 110, on-demand code execution service 142, etc. may be implemented as software, hardware, or a combination of both. In some embodiments, the implementation of these components may be part of a provider network 100.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

Thus, a cloud provider network (or just "cloud") typically refers to a large pool of accessible virtualized computing resources (such as compute, storage, and networking resources, applications, and services). A cloud can provide users with convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network 106 (e.g., the Internet, a cellular communication network).

Generally, the traffic and operations of a provider network may broadly be subdivided into two categories: control plane operations carried over a logical control plane, and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service 142), which in turn utilizes a compute instance to execute the code—typically without the user having any control of or knowledge of the underlying compute instance(s) involved.

For example, in various embodiments, a "serverless" function 140 may include code provided by a user or other entity—such as the provider network 100 itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference corresponding to an endpoint, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Generally, many types of modern computing applications rely on databases, and in particular, relational databases. Computing applications, such as websites or mobile application backends, may be implemented within a provider network 100 using one or more compute-type services such as a hardware virtualization service or serverless, on-demand code execution service 142, or in another location—e.g., a customer network 118—by one or more computing devices (e.g., by applications executing in a data center, by applications executed by "client" devices such as personal computers, smart devices, mobile devices, etc.). At some point, these computing applications may use database functionality provided by one or more database instances (e.g., database 121, database 122 of a database service 110) by sending messages carrying database statements (e.g., Structured Query Language (SQL) statements) to the database instance(s), which can perform operations in response and optionally send back database results (e.g., status indicators, data stored by a database, data generated based on data stored by the database responsive to a query, etc.). In this manner, the computing applications act as a "client" application by requesting the database instance(s) to perform some operation(s) and thus act as a "server."

As discussed above, a user, such as a user 102 of the service provider network 100, may want to migrate data (e.g., data 126 and/or stored procedures 124) from one database (e.g., a source database 121) to another database (e.g., a target database instance 122) for any of a variety of reasons. In some configurations, a migration service 150 provides functionality for migrating data from the source database 121 to the target database 122. The source DBMS associated with the source database 121 and the target DBMS associated with the target database 122 may be the same type of DBMS (e.g., a homogeneous migration) or different types of DBMS (e.g., a heterogeneous migration). For example, the migration service 150 may be used to migrate data from database created using a Microsoft™ SQL Server DBMS to another database created using a Microsoft SQL Server DBMS during a homogeneous migration. The migration service 150 may also be used to migrate data in a heterogeneous migration, e.g., from a database created using an Oracle™ DBMS to a database created using the Amazon™ Aurora™ DBMS, or from a database created using the Microsoft™ SQL Server to a database created using the Amazon™ Aurora™ DBMS, as an example. A DBMS is a software product that manages databases and allows a user to create, edit and delete databases, tables, and the data within the tables. However, as generally used herein, a "database" or "database instance" may be used to refer to a database and a DBMS collectively.

According to some examples, the source DBMS may remain operational during the migration of the data and the source schema from the source database 121 to the target database 122, e.g., by continuing to receive and process requests from users that may potentially change the source database 121 (e.g., creating new records, deleting records). Thus, the user may continue to utilize the source database 121, minimizing downtime to applications that rely on the data 126 in the source database 121. In some configurations, a user may continue to utilize the source database 121 during the migration, as well as after the migration. For instance, after the migration, the migration service 150 may continue to migrate changes made to the source database 121 and/or the target database 122. As illustrated, the source database 121 may be deployed in a customer-affiliated or owned network 118 (e.g., a colocation environment, a private cloud, a public cloud) that is distinct from the provider network 100; however, in other embodiments the source database 121 may be in other locations, such as implemented in a provider network 100 via a database service 110, via a server executed by a hardware virtualization service, or the like.

As discussed above, heterogeneous database migrations are generally very complex, difficult, and time consuming. For instance, the source and target databases may use different formats for schema objects, as well as different syntax and language structures for the code used in stored procedures and functions. Because of these differences in format, the schema objects in the source database should be converted to a format that is compatible with the target database if the user wants to use those types of objects within the target database. However, such conversions may not be easily implemented—especially in an automated manner—requiring extensive, and bug-prone, manual efforts.

To assist a user in heterogeneous migrations, the migration service 150 in some embodiments includes a schema conversion service 154 that attempts to convert, without user intervention (or with limited user intervention), the source schema and code, including views, stored procedures and functions (which may be collectively referred to as a "schema"), to a format compatible with the target database 122. In some configurations, the conversion functionality is created for each supported database. For example, code to convert a schema used by an Oracle™ database to a MySQL™ format, an Aurora™ format, and the like may be developed for use by the schema conversion service 154. In some embodiments, the conversion functionality may be accessed via the migration service 150 that can be accessed via a migration API.

In some configurations, the user computing device 104 may include a software product (e.g., a schema conversion tool 152) that may access the functionality of the schema conversion service 154 within the migration service 150, or may perform aspects of this described functionality itself. For example, as shown by circle (1), in some embodiments the schema conversion tool 152 attempts to convert the source schema into the target schema without user interaction, e.g., by connecting to the source database 121 (e.g., via use of provided credentials and connection information) to analyze its schema, including any stored procedures 124.

In some embodiments, upon detecting a set of stored procedures utilized by the database, the schema conversion tool 152 may attempt to analyze the set of stored procedures 124 to determine whether ones may or may not be converted to a format that is appropriate for direct use by the target database 122, which may include looking for problematic commands therein, attempting to convert the stored procedure to a format used by the target database to identify potential problems or failures, etc. Accordingly, the schema conversion tool 152 may determine a confidence value score indicating a predicted likelihood that a stored procedure can be successfully translated for use or directly used by the target database. This confidence value score may be a binary value (e.g., TRUE indicating a high confidence, FALSE indicating a low confidence), a numeric value (e.g., 100% confidence of a successful translation/migration, 95% confidence, etc.), a textual/string value (e.g., "HIGH" or "LOW" confidence), or another type of value or score derivable by those of skill in the art.

In some embodiments, the schema conversion tool 152 (or the schema conversion service 154, such as through a web-based console application) may cause a list of detected stored procedures to be presented to the associated user. For example, FIG. 2 is a diagram illustrating an exemplary user interface 200 of provided by a schema conversion tool or migration service console as part of streamlined database migration with stored procedure extraction into on-demand execution environments according to some embodiments.

In some embodiments, the user interface 200 may provide a list of identifiers (e.g., names) of detected stored procedures. In this example, the list includes six stored procedures—"validate_user_roles," "validate_manager_employees," etc.

Each stored procedure, in some configurations, has one or more user input elements (e.g., radio buttons, check boxes, or the like) associated therewith to allow a user to indicate what should be done with the respective stored procedure. In this example, each stored procedure has one or more radio buttons associated therewith allowing the user to indicate whether the stored procedure should be translated and migrated to the target database, migrated to a function of an on-demand code execution service, or not migrated. In this example, the first stored procedure "validate_user_roles" is shown as being designated by the user to be migrated to the target database, while the fifth stored procedure "check_employee_records" is shown as being designated by the user to be migrated to a function of the on-demand code execution service. This interface may be generated based on the confidence value scores determined by the schema conversion tool 152. For example, each stored procedure may be shown with the associated confidence score in some manner (e.g., via directly specifying the value, or by indicating it via use of colors, icons, inclusion/omission of radio buttons, or the like).

A user may seek to have some stored procedures within the target database and some stored procedures deployed as a function of an on-demand code execution service for various reasons. For example, if a particular stored procedure performs operations for a task that requires very low latency, such as validating particular inputs to the database or for stored procedures invoked by triggers, the user may want the stored procedure to be within the target database. However, for other use cases, a user may prefer for application code (or, business logic) to be removed from the database and implemented in some other format, which may be easier to maintain and extend. For example, in some cases by moving stored procedures outside the database, the stored procedures can be scaled independently, tested easier, managed via version control systems, etc. Moreover, in some cases a stored procedure may not be able to be converted for use with a target database—and especially for databases that do not natively provide stored procedure functionalities—and thus these stored procedures would need to be deployed elsewhere.

As described above, in some configurations the schema conversion tool 152 and/or schema conversion service 154 may analyze the stored procedures to determine whether it is possible for the stored procedures to be migrated to the target database. For example, when a confidence value for a stored procedure satisfies a condition—e.g., whether the confidence value is sufficiently "high" according to some threshold or test—the associated stored procedure can be determined to be a candidate for translation/migration to the target database. Similarly, when the confidence value does not satisfy the condition—e.g., the confidence value is not "high" enough—the associated stored procedure can be determined to not be a candidate for translation/migration to the target database. The results of this determination can be used in the user interface 200, e.g., by presenting the confidence values in some manner, by removing the option to migrate the stored procedure to the target database, as is shown in FIG. 2 with regard to the third and fourth stored procedures, etc. However, in some embodiments the selection of which stored procedures are to be migrated/translated to the target database and which are to be migrated to a function of an on-demand code execution service may be performed automatically based on the confidence values and conditions described above.

Turning back to FIG. 1, upon the user providing input via such an exemplary user interface 200, the schema conversion tool 152 may communicate, at circle (2), with the schema conversion service 154 to migrate the stored procedures (and other schema elements). For example, the schema conversion tool 152 may transmit the stored procedures along with the user input specifying how the stored procedures are to be migrated (e.g., via identifiers of selected destinations for the stored procedures) to the schema conversion service 154. The schema conversion service 154 may utilize logic to convert any stored procedures that are indicated as needing to be migrated to the target database 122 itself and cause these translated stored procedures 112A to be deployed to the target database 122 at optional circle (3B) as reflected by commands sent to the database service 110 and/or target database 122 instance itself at optional circle (3A).

At a time before, concurrent with, or after the operations reflected by circles (3A)-(3B), the schema conversion service 154 may cause ones of the stored procedures (e.g., those selected by the user via a user interface such as the user interface 200 shown in FIG. 2) to be deployed as stored procedures 112B implemented as functions 140 of an on-demand code execution service 142.

Such a deployment to a "serverless" environment can be accomplished using a variety of techniques. For example, in some embodiments the "raw" stored procedure code may be converted (or "compiled") by a converter 128 (which may be part of the same function 140A, a separate function 140B, or located elsewhere, such as within the schema conversion service 154) into an intermediate representation 114 (e.g., an assembly-language type format) that can be interpreted by an interpreter 130. This configuration may utilize a comparatively sophisticated converter 128 program (derivable to those of skill in the art) but can provide the benefit of simplified execution of the intermediate representation 114, and/or allow for the use of existing assembly-type optimization programs to further optimize the function's execution.

For example, FIG. 3 is a diagram illustrating code for an exemplary stored procedure 305 supported by a first type of database and a data structure 310 including an intermediate representation of the stored procedure that can be useful for streamlined database migration with stored procedure extraction into on-demand execution environments according to some embodiments.

This exemplary stored procedure 305, named "emp_salary_increase", is a toy example accepting an input argument "emp_id" and writing a result to an output argument of "salary_inc" and may be of a stored procedure format (e.g., PL/SQL) accepted by some types of databases. The subsequent code of the exemplary stored procedure 305 performs a few operations ranging from an assignment, a loop including a multiplication and a conditional check, along with a separate conditional "if then" statement, before updating the output value and returning.

This exemplary stored procedure 305 may be converted (or compiled) into an intermediate representation (IR) by a converter 128 that can be executed by an interpreter as part of a function of an on-demand code execution service. For example, the stored procedure in some embodiments can be used to construct an abstract syntax tree (AST) known to those of skill in the art, e.g., according to a grammar (e.g., an ANTLR grammar, a grammar of the schema conversion tool 152, etc.). The AST may then be parsed, and a series of listeners may build the assembly-like IR during this parsing. This conversion may occur by the function 140A or schema conversion service 154 issuing a request to the function 140B including the stored procedure code 305, and a response comprising a data structure 310 carrying the IR may be returned. In this example, the data structure 310 includes fields identifying the name of the stored procedure, identifiers of parameters (e.g., whether a parameter is an input, output, or input/output parameter, a name for the parameter, and a type), and the IR code (here shown as the value of the "ASM" attribute).

In some embodiments, each line of the IR includes one or more of (1) a list of variables in scope, in order, (2) a pipe ("I"), (3) an instruction, and (4) arguments. The variables may be represented "name @ index @ type", where name is the name of the variable as specified by the user, the index is a unique index for the variable (as variables can share names as new blocks are defined, the name@index uniquely identifies them), and the type is a type of the variable (e.g., int, row, table, cursor . . . ). The instructions may include a number of different instructions, such as one or more of the instructions shown in the following table:

| Column 1 Instruction | Column 2 Arguments | Column 3 Description |
| --- | --- | --- |
| set | var expression | Sets var to the values of the expression |
| jump | line_num | Jumps to a given line number |
| jump_if_not | line_num expression | Jumps to line number if expression is false |
| jump_if_cursor_eof | line_num cursor_name | Jumps to line number if the cursor has run out of rows |
| stmt | sql | Executes the SQL |
| error | error code | Raises error with given code |
| cpush | name sql | Creates a cursor with given sql |
| copen | name | Opens the cursor (runs sql) |
| cfetch | name var1 var2 . . . | Loads the next from from the cursor, and loads it into the vars |
| cclose | name | Closes cursor |
| cpop | name | Removes cursor |
| hpush_jump | line exp_types | Declares an exception hander for exp times, jumps to line |
| hreturn | line | Returns from an exception handler |
| hpop | | Removes most recently added exception handler |

Turning back to FIG. 1, this IR 114 can be interpreted by an interpreter 130 at the time of the invocation of the function 140A, which may include communicating with the target database, and eventually return a result—e.g., a computed value, an indicator of success/an acknowledgement, etc.

In some embodiments, the converting/compiling of the stored procedure by the converter 128 may generate an even lower-level IR than the simplified assembly-type set outlined above, which could be used for a system such as LLVM. Though this technique may need a more complex converter 128, the complexity of the IR execution can be further reduced, leading to faster execution and the possibility of use of existing assembly optimizer tools.

In some embodiments, the stored procedures may alternatively be translated into another programming language as translated stored procedure 116, such as a general-purpose programming language (e.g., Python, Java, C, etc.) that could be interpreted or compiled and executed. This can produce a benefit for the database owner into potentially having code (e.g., to manage, analyze, and/or update) for the stored procedure 112B in a language that is more easily understood by more engineers.

In some embodiments, instead of using an IR in an assembly-like form, the code can be directly interpreted as the AST is parsed. This technique beneficially skips the need for assembly generation, though it may not be as performant.

Another option used in some embodiments includes obtaining a compiled form of the stored procedure from the source database itself (or a database of the same type, such as one executed within the provider network). In some cases, source databases have functionality that may or may not be exposed that can compile stored procedures, and these compiled versions can be obtained and utilized.

Upon configuring a version of the stored procedure(s) as functions 140A in the on-demand code execution service 142, the schema conversion service 154 may be provided identifiers of the functions (e.g., network addresses of endpoints associated with these functions) by the on-demand code execution service, which the schema conversion service 154 may optionally provide at circle (5) to a database connection management and governance system 160 ("DCMGS") that provides database proxy functionalities. The DCMGS 160 may update a stored procedure map 132 based on this information to associate a stored procedure identifier (e.g., its name) to an identifier of the function 140A, such as a network address of an endpoint or a function name useful to invoke the function.

In some embodiments, a user may utilize a database proxy 120 of the DCMGS 160 between clients of the database and the database itself. The database proxy 120 may identify database commands originated by client applications that are destined to the database seeking to invoke a particular stored procedure, and instead of passing the command on to the backend database, may determine an identifier of the corresponding stored procedure function (e.g., by looking up a function name and/or network address associated with an endpoint associated with the function) using the identifier of the stored procedure. The database proxy 120 may thereafter send a request to invoke the function, e.g., an HTTP request to an Internet Protocol (IP) endpoint associated with the respective function or on-demand code execution service 142. The function may perform its operations and return a result to the calling database proxy instance, which in this scenario acts as a client application from the perspective of the function. The database proxy instance may then return the result back to the calling client application, which is insulated from knowing the details of the stored procedure implementation.

Figure 4:
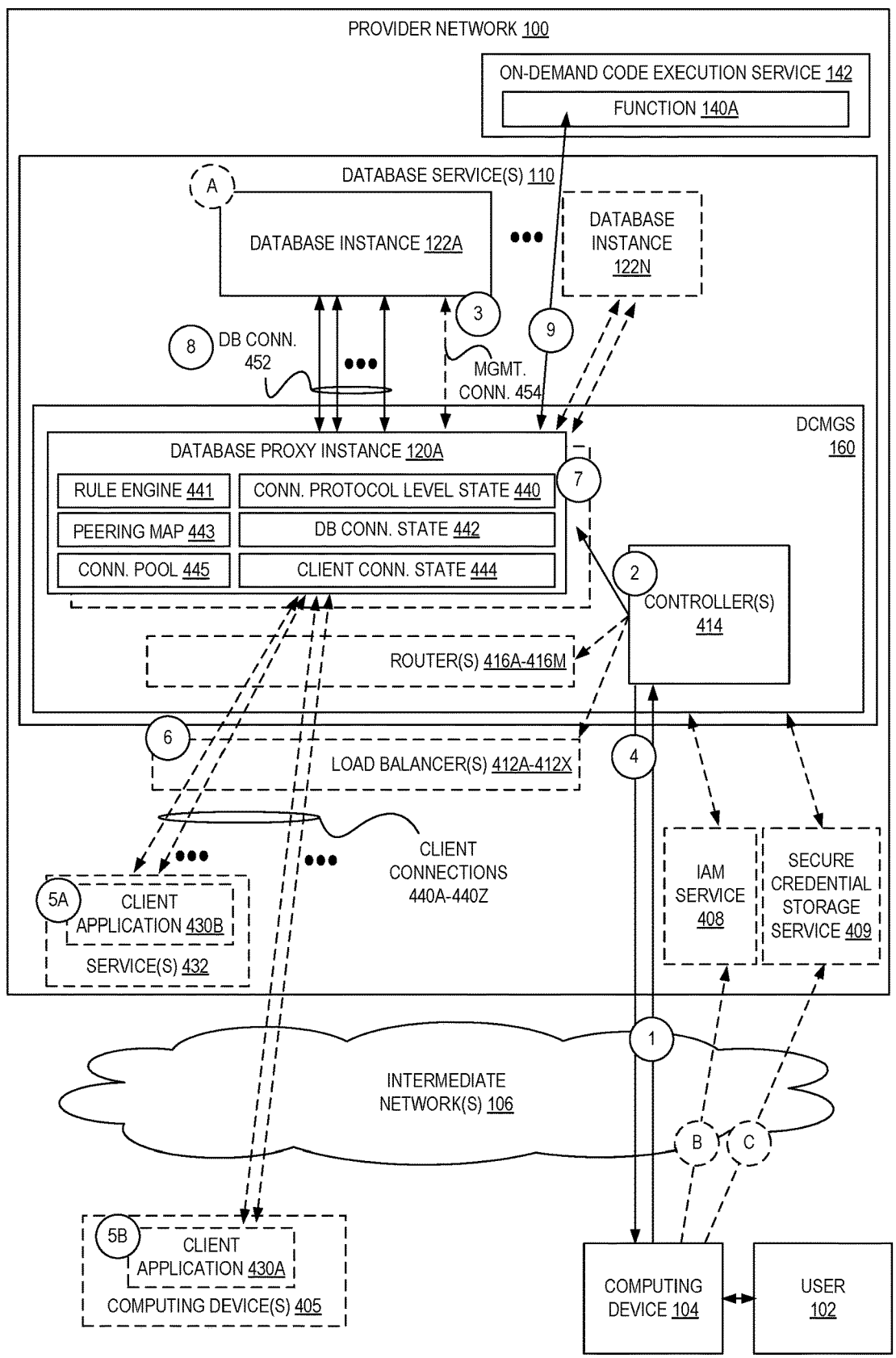
FIG. 4 is a diagram illustrating exemplary components of a database connection management and governance system, and the use thereof, for invoking extracted stored procedures in on-demand execution environments according to some embodiments.

For further detail, FIG. 4 is a diagram illustrating exemplary components of a database connection management and governance system 160, and the use thereof, for invoking extracted stored procedures in on-demand execution environments according to some embodiments.

In some embodiments, a database instance 122A-122N is an isolated database environment running in the provider network 100, and typically contains one or multiple user-created databases that can be accessed using the same client tools and applications that are used to access standalone database instances. Each database instance 122A-122N may have a database instance identifier, which can be a user-supplied name that uniquely identifies (e.g., within the entire provider network 100, or within a portion or region of the provider network 100) the database instance 122A-122N during interactions between the user and the database service 110 interfaces. Each database instance 122A-122N may support a database engine. For example, the database service 110 may support a number of database engines, including but not limited to MySQL, MariaDB, PostgreSQL, Oracle, Microsoft SQL Server, Amazon Aurora, etc. In some embodiments, the database service 110 may support one or more NoSQL databases, one or more object database management systems, one or more object-relational database systems, one or more data warehouse systems (e.g., Amazon Redshift), a "serverless" interactive query service, or the like. Interactions with the database instance(s) 122A-122N may be performed via use of database statements (e.g., queries, commands, or the like) that may adhere to a defined query language (as defined by a query language definition), such as one or more of the many dialects, extensions, and implementations of SQL, like Transact-SQL (T-SQL), Procedural Language/SQL (PL/SQL), PL/pgSQL (Procedural Language/PostgreSQL), SQL-86, SQL-92, SQL:2016, etc. The database instance(s) 122A-122N may thus implement a variety of types of databases in a variety of types of configurations. For example, a first database instance 122A and a second database instance 122B may be a master-failover pair, completely different databases, etc.

In some embodiments, users 102 may interact with the DCMGS 160 to configure database proxy service that automatically manages and governs database connections on behalf of the user and the user's applications 430A-430B.

As indicated above, many types of modern applications 430A-430B reliant on databases may need to overprovision and manage database resources for a variety of reasons. The DCMGS 160 can eliminate such overprovisioning and active management typically required.

For example, many applications have unpredictable workloads. Applications that support highly variable workloads may attempt to open a burst of new database connections to support surges. The DCMGS's 160 connection governance functionalities can allow users to gracefully scale applications dealing with unpredictable workloads by efficiently using database connections. The DCMGS 160 can reutilize established database connections to serve queries or transactions from multiple application requests. Thus, users can support more application connections over fewer database connections, providing the efficient use of database resources. The DCMGS 160 can allow users to maintain predictable database performance by regulating the number of database connections that are opened. In some embodiments, the DCMGS 160 can shed unserviceable application requests to preserve the overall performance and availability of the application.

As another example, some applications frequently open database connections. Applications built on technologies such as serverless, PHP, or Ruby on Rails may frequently open new database connections on application requests. The DCMGS 160 can allow customers to maintain a pool of database connections to avoid the inefficiencies of establishing new connections with each new request.

Moreover, many applications keep database connections open but idle (or unused). Applications in industries such as SaaS or eCommerce often keep database connections idling to minimize the response time when a customer reengages. Instead of overprovisioning databases to support mostly idling connections, users can configure the DCMGS 160 to maintain these idle connections while only establishing database connections as required to optimally serve active requests.

As yet another example, many applications require high availability through transient failures. In some embodiments, the DCMGS 160 can allow users to build resilient applications that can transparently tolerate transient failures without complex failure handling code. The DCMGS 160, in some embodiments, automatically routes traffic to a standby database instance very quickly while preserving many or all application connections.

Further, the DCMGS 160 in some embodiments provides improved security and centralized credential management. The DCMGS 160 aids users in building secure applications by giving them a choice to enforce Identity and Access Management (IAM) based authentication (e.g., via an IAM service 408) for accessing databases, and can also enable users to centralize database credentials management through a secure credential storage service 409.

For example, a user 102 may utilize an application (e.g., a web-based console) or other functionality to launch one or more database instances 122A-122N (as reflected by circle (A)) within a database service 110, which may be relational databases, NoSQL instances, or other type of database. For example, the user 102 may utilize a web-based console application to select a "launch DB instance" user interface input element and provide a number of configuration parameters, such as an identifier of a requested DB engine type and version, license model, instance type, storage type and amount, master user credentials, etc. Alternatively, the computing device of the user may issue an API call to the database service 110 with similar information, or the user may launch and/or configure database instances using other techniques known to those of skill in the art.

Optionally, as shown by circle (B), the user 102 may cause the computing device 104 to configure an IAM service 408 with role information allowing the DCMGS 160 to create resources on behalf of the user's account (e.g., one or more load balancers 412A-412X, one or more routers 416A-416M, one or more database proxy instance(s) 120A-120N, etc.), and/or to configure the IAM service 408 with execution role information associated with a client application 430A-430B.

As shown by circle (C), the user 102 may also optionally store a "secret" value (e.g., a username and/or password for accessing the database instance(s)) with a secure credential storage service 409 (e.g., AWS Secrets Manager) that can securely (e.g., via encryption, access controls, etc.) store and control access to these secret values.

The user 102 may then, via use of an application executed by the computing device 104, configure the DCMGS 160 to provide connection management and governance for the database instance(s) 122. As one example, the user 102 may utilize one or more user interfaces to provide configuration information via one or more messages (as shown at circle (1)) to a controller 414 (of potentially many controllers 414 that may be run in a distributed manner) of the DCMGS 160. The configuration information may include, among many types of data, one or more of identifiers of the database instance(s) 122A-122N, a name for the proxy, an identifier of the type(s) of database engines implemented by the database instance(s) 122A-122N, whether backend database connections should be encrypted (e.g., using TLS), a set of tags, etc.

Upon receipt of these one or more requests, the controller 414 may initiate a workflow to configure database connection management and governance accordingly. For example, in some embodiments the controller 414 creates resources in a provider network account that is associated with the user's account, such as an endpoint (e.g., an entity associated with a network address that can receive network traffic destined to that address) that will later be used by the client application(s) 430 to send database statements toward the database instance(s) 122. The workflow may also include provisioning one or more database proxy instances 120A-120N, which may include launching compute instances (e.g., virtual machines) with database proxy software configured as described herein, and/or configuring the database proxy instance(s) 120A-120N for the user (e.g., configuring a rule engine 441 with system and/or user-provided rules to control how each database proxy instance is to operate). In some embodiments, the controller 414 may launch at least two database proxy instances 120A-120N (e.g., in an active-active configuration), which may be specifically placed in different availability zones (e.g., isolated failure domains) of the provider network 100. Before and/or after the launch of each database instance(s) 122A-122N, the controller 414 may directly (or indirectly, such as via configuration initialization files or flags) configure the database instance(s) 122A-122N and/or the database proxy instance(s) 120A-120N according to configuration information provided by the user (e.g., at circle (1)).

Upon being launched and configured, in some embodiments each database proxy instance 120A-120N opens a management connection 454 at circle (3) to each database instance 122 (as identified by the user 102 during the initial configuration), optionally using authentication/authorization information (e.g., credentials) provided by the user 102 as configuration information, provided by the IAM service 408, provided by the secure credential storage service 109, etc. The management connection 454 allows the database proxy instance(s) 120A-120N to ensure that the database instance(s) 122A-122N are running and responsive, that the database instance(s) 122A-122N can be successfully accessed via provided credentials, etc. The management connection 454 may also allow the database proxy instance(s) 120A-120N to detect a failure of a database instance 122A and cause additional database statements received during this downtime to be instead passed to another database instance (e.g., a failover database instance), and/or may restore the use of the initial database instance if it comes back up. Thus, for client connections that were not actively using a backend database connection to a failed database instance, these clients may not be impacted by or even notice the failure whatsoever.

The controller 414, as part of the workflow, may also configure a load balancer 412, one or more routers 416A-416M, and the endpoint, so that the endpoint provides database statements (e.g., requests originated by clients that are destined to a database instance) to a database proxy instance (e.g., 120A), which may occur through the load balancer 412 to a router 416, which may identify a database proxy instance 120A, such as via an endpoint identifier of that where the database statement was received. The controller 414 may also configure a rule engine 441 of each database proxy instance 120 with rules to control how the database proxy instance 120A is to operate. The rules may be configured by the operator of the provider network 100 and/or by the user 102. For example, a user 102 may provide configuration data indicating if the user 102 wishes to pin certain client connections to certain database connections, and optionally an indication of how to determine which connections are to be so pinned (e.g., defining conditions of a client connections—such as the presence of a database statement that creates a prepared statement—that, when observed, are to cause the client connection to be pinned to a database connection). As another example, the user 102 may provide configuration data indicating if, when, and/or how to treat connections as being terminated (e.g., due to an amount of inactivity), whether connection multiplexing is to be enabled, whether pinning is to be enabled, what number of possible database connections may be utilized, whether (and/or how) to rewrite certain database statements, etc. During operation, each database proxy instance 120A may thus use this rule engine 441 and the associated rules to determine what operations to perform.

In some embodiments, the router(s) 416 and database proxy instance(s) 120A-120N may implement a heartbeat mechanism in which the database proxy instance(s) 120A-120N send a heartbeat message on a periodic or scheduled basis to one or more of the routers 416A-416M that indicates the continued availability of the database proxy instance(s) 120A-120N. In some embodiments, the heartbeat message includes a load value indicating a "load" currently (or recently) being placed on that proxy instance. For example, the load value may be a number of client connections 440A-440Z that the database proxy instance 120A is handling (or has the ability to handle), and/or an amount of processor utilization, memory utilization, network utilization, etc.

In some embodiments, the router 416A may select one of the database proxy instance(s) 120A-120N to be a recipient of a client connection based on this load value associated with each of the one or more database proxy instance(s) 120A-120N that are associated with the endpoint in which the database statement was received. For example, the router 416A may select a least loaded one of those matching database proxy instance(s) 120A-120N, e.g., having a smallest load value, though other routing mechanisms may be implemented. Such a mechanism can beneficially provide value when there are multiple routers 416 utilized, as a purely "local" decision made on the part of the router may be non-optimal due to the actions of other routers. For example, although one router may only send a small number of connections to a particular database proxy instance (and thus it may appear, locally, as being not busy), it may be the case that other routers have sent a huge number of connections to the proxy instance. As a result, the router can avoid making a poor decision based only on its local view, and instead can gain global visibility into the true load of the proxy due to the reported load value via the heartbeat messages.

The controller 414 may then, at circle (4), send an identifier of the endpoint (e.g., one or more of an IP address, hostname, port value, etc.) to the computing device 104 of the user 102, which the user 102 can use to configure the client application(s) 430A-430B at circle (5A) and/or circle (5B). For example, the user 102 may update a database connection string used by the client application 430 to connect to the database instance(s) via that endpoint identifier.

Thereafter, upon a client application 430 needing to access a database instance 122, the client application 430 may open a client connection 440A with a database proxy instance 120A at circle (6). This connection may be implemented by, for example, a client application 430B executed within a virtual network within the provider network 100 sending a request to an endpoint within the virtual network, which is thus routed to a load balancer 412, router 416, and/or database proxy instance 120A that may be outside the virtual network—in this manner, the database proxy 120A can be optionally "surfaced" within multiple different virtual networks within the provider network 100.

The database proxy instance 120A may use a role of, or an authentication token provided by, the calling application for authorization and/or authentication, e.g., by utilizing an IAM service 408 to determine whether the role is allowed access to the database instance (and thus the client application need not have direct access to database authentication credentials), to determine whether the authentication token is valid and is associated with privileges to access the database instance, etc. Additionally, or alternatively, the database proxy instance 120A may use a token provided by the client application (e.g., as part of opening the connection or with a database statement request) to retrieve a credential (e.g., a username and/or password) for accessing the database instance, or retrieve this token from the IAM service 408 and use it with the secure credential storage service 109 to obtain the credential, which may be passed on to the database instance 122A to authenticate the client. Additionally, or alternatively, the database proxy instance 120A may use a token comprising a username/password provided by the client application (e.g., as part of opening the connection or with a database statement request) to directly authenticate the client with the database instance.

The database proxy instance 120A may obtain a database connection 452 (between the proxy and the database instance) at circle (7) by opening a new database connection 452, identifying and thus selecting a database connection from a connection pool 445 of available open connections that matches the characteristics of the client connection, or update an existing connection from the pool 445 of open available connections to match an expected connection state for the client connection (e.g., by sending database statements/commands to the database instance to change a session state as described herein). In some embodiments, the database connection 452 may or may not be "pinned" to the client connection (i.e., dedicating it for that client's use) based on configured rules and/or thresholds, and further may be switched between being un-pinned (i.e., multiplexed) to pinned or between being pinned to un-pinned with similar rules and/or thresholds. When a particular client connection and database connection have been peered—either temporarily or when pinned—the database proxy instance 120A may update a peering map 443 data structure so that it can determine which connections are in use, which connections are peered, etc. In some embodiments, when a database connection that is in the pool 445 is selected and used, the database proxy instance 120A may thus remove that connection from the pool 445 (e.g., by removing an identifier of the connection, or updating a status flag associated with the connection, from the pool 445 structure) and/or update the peering map 443 to reflect the association of the connections.

In some embodiments, the database proxy instance 120A may track the database statement traffic to identify commands or actions made within the traffic that cause the session state of the connection be modified. The database proxy instance 120A may thus maintain a mapping, for each client connection (in a client connection state 444 store) and database connection (in a database connection state 442 store), of the current "state" of the connection.

It is known that for a database connection, a client application and/or the database instance itself may set or modify settings of the connection. For the life of this connection—or until these settings are further modified—both the database instance and the client implicitly assume this state to have been agreed upon. However, due to possible multiplexing of these database connections 452, a particular database connection 452 may be used by different clients having different expectations as to the state of the connection. Thus, the database proxy instance 120A may track the database statement traffic to identify the state of the connection, e.g., by watching for particular known statements that cause state changes. This state may thus be tracked, as indicated above, on a per client connection and database connection basis via state 442/444.

Thereafter, when a database statement is received on a client connection 440A, if the client connection is not "pinned" to a particular database connection, the database proxy instance 120A can identify an available open connection from the pool 445 of connections between the proxy instance and the database instance using the tracked state of the client connection (444) and comparing it to the state of ones of the database connections (442). It may be the case that an exact match is found, and thus that matching database connection 452 can directly be used to process that database statement. However, if no matching database connection is found via this state comparison process, the database proxy instance 120A can modify the state of an available database connection to match the client connection state, e.g., by replaying or issuing one or more database statements (e.g., to set an encoding value or time zone).

Various types of state may be tracked in various embodiments depending on the particular types of database protocols in use. For example, the state may include system variables that have been set on a per-connection basis, including but not limited to a time zone value, a session timeout, a connection mode (e.g., read/write), a particular mode of interpretation the database uses (e.g., ANSI mode, traditional mode), etc. As another example, the state may include connection properties, including but not limited to a character set, a user name, whether the connection uses encryption, etc. As another example, the state may include database properties such as the existence of a temporary table or prepared statement (e.g., a SQL template) that was created during the connection (that may need to be referenced later).

However, in some embodiments, if any (or particular types) of state changes are made, the database proxy instance(s) 120A-120N may alternatively "pin" the client connection with the associated database connection (thus eliminating multiplexing for that database connection until the client connection terminates), which may be conditioned on the proxy instance having sufficient other database connections that would remain available (per a configurable threshold) for multiplexing.

Having obtained a proper database connection 452, at circle (8) the database proxy instance 120A can forward the database statement received from the client application 430 to the database instance 122A, which can process the database statement and return any necessary response, which can be sent back to the client application 430.

In some cases, as described herein, the database proxy instance 120A can alternatively identify commands to invoke a stored procedure, determine that the stored procedure is actually implemented by a function of a on-demand code execution service, and send, at circle (9), a request to invoke that function. A result may be sent back to the proxy and ultimately returned to the client application.

In some embodiments, the database proxy instance 120A may also track the connection protocol level state 440 of each connection to determine whether the database instance has completed all processing for a particular database statement (e.g., query). Thus, the database proxy instance 120A may be state-aware in terms of the connection protocol itself and keep track of this state as connection protocol level state 440. Thus, the database proxy instance 120A can determine at which point it can "release" a database connection 452 into the pool as an available connection. For example, in the middle of a transaction (e.g., between when a query seeking data has been passed to the database instance and when all data has been returned) it is improper to release the connection, but when the database proxy instance 120A can verify that the transaction has completed it can release it. The database proxy instance 120A may need to track various subtle protocol scenarios to prevent early release, such as when a client sends a multi-statement query (wherein the database will return multiple sets of results), and thus the database proxy instance 120A may track how many sets of results are to returned and thus may determine when the transaction is complete.

Figure 5:
FIG. 5 is a diagram illustrating an exemplary connection string modification of code of a client application for utilizing a database proxy as part of streamlined database migration with stored procedure extraction into on-demand execution environments according to some embodiments.

In this manner, client application code previously calling a stored procedure of the source database would not need to be modified, as the application may continue to send invocation requests over a typical database connection, albeit with a database proxy. Thus, the application may simply be updated to connect to the proxy. For example, FIG. 5 is a diagram illustrating an exemplary connection string modification of code of a client application for utilizing a database proxy as part of streamlined database migration with stored procedure extraction into on-demand execution environments according to some embodiments. As described herein, upon configuring the proxy-based database connection management and governance, the DCMGS 160 may provide a response to the user/client indicating an endpoint (e.g., one or more of a network address, hostname, port, etc.) that the user may utilize to access the database instance(s). The user may thus configure its application(s) to access the database by, for example, simply changing a query connection string to use the returned hostname and port. Thus, an existing connection string 505 may be modified by changing the DATABASE_INSTANCE_HOSTNAME to the DCMGS-returned DBPROXY_DNS_NAME (in 510) and the DATABASE_INSTANCE_PORT (in 510) to the DBPROXY_PORT (in 510).

Turning back to FIG. 1, at optional circle (6) the schema conversion service 154 may provide identifiers of the function(s) implementing the stored procedure(s) to the computing device 104 of the user 102, which may include a URL/URI, IP address, etc., that can be used to invoke the function(s). In this case, the user 102 may update the client applications 430A-430B to "directly" call on-demand code execution service functions 140A instead of issuing invocation requests to the database for those of the stored procedures that were migrated to the on-demand code execution service.

Figure 6:
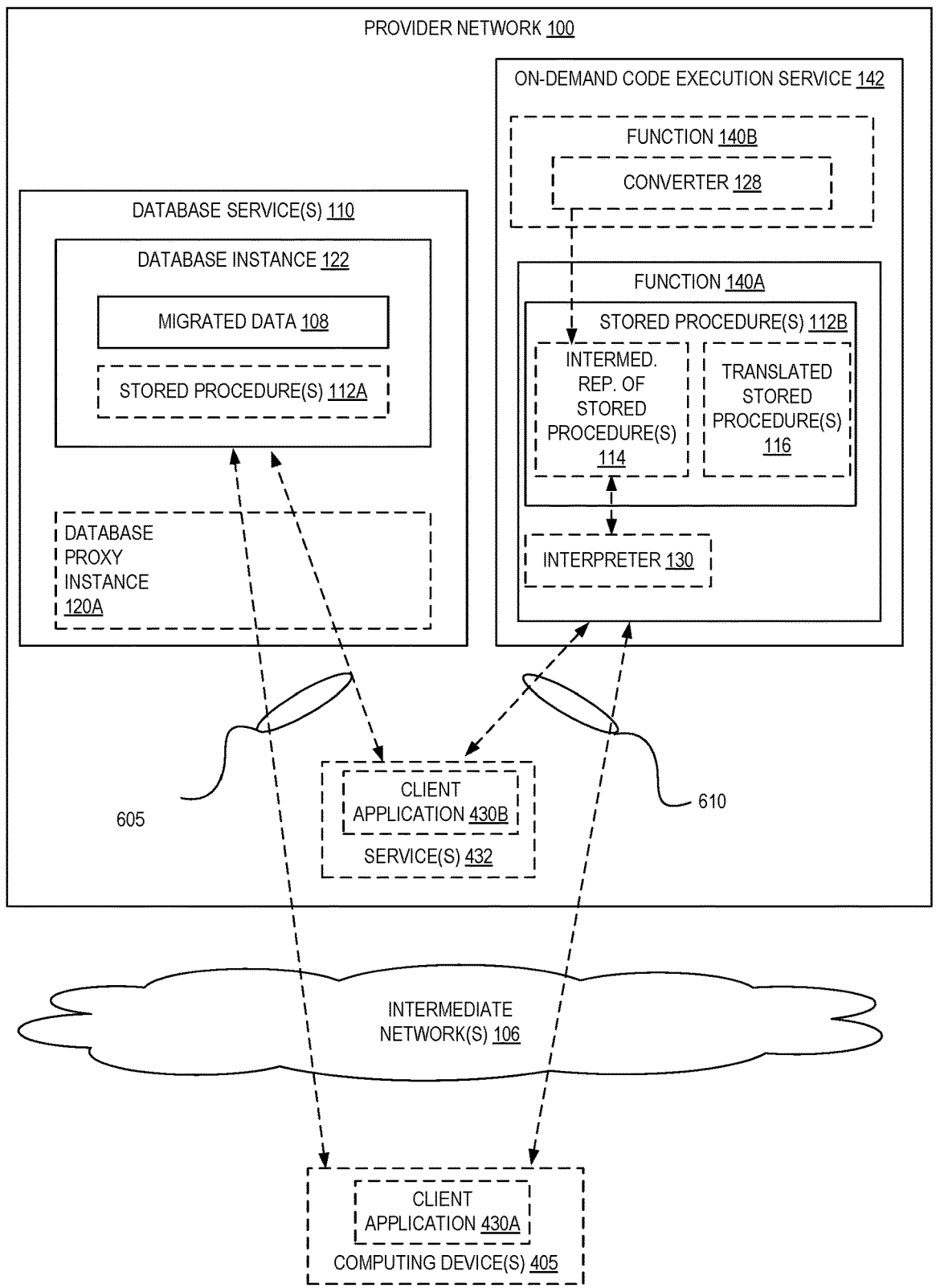
FIG. 6 is a diagram illustrating exemplary client application operations for directly invoking extracted stored procedures in on-demand execution environments according to some embodiments.
Figure 7:
FIG. 7 is a diagram illustrating exemplary client application code modification for directly utilizing a serverless function as part of streamlined database migration with stored procedure extraction into on-demand execution environments according to some embodiments.

For example, FIG. 6 is a diagram illustrating exemplary client application operations for directly invoking extracted stored procedures in on-demand execution environments according to some embodiments. In this figure, the client applications 430A-430B may be modified to directly call the target database instance 122 (or indirectly call, such as via a database proxy instance 120A) to execute any stored procedures 112A that were migrated thereto as part of traffic 605, and may be separately modified to directly invoke the functions 140A corresponding to stored procedures migrated to the on-demand code execution service as part of traffic 610. To directly call the on-demand code execution service function, the client application code may be modified such as shown in FIG. 7, which is a diagram illustrating exemplary client application code modification for directly utilizing a serverless function as part of streamlined database migration with stored procedure extraction into on-demand execution environments according to some embodiments. As shown herein, a code segment 705 including a call to a database to execute a stored procedure may be replaced with a different code segment 710 for calling the function, which includes parameters such as a function name corresponding to the desired stored procedure, an invocation type, a payload carrying input argument values, etc.

Turning again to FIG. 1, at circle (7) the user 102 may optionally cause the computing device 104 to issue commands (e.g., via use of a web-based console provided by the migration service 150 or other services of the provider network 100) to migrate the data 126 from the source database 121 to the target database 122 as migrated data 108. In some embodiments, the migration is implemented using a replication instance 129 that communicates with both the source database 121 and the target database 122 to achieve the migration.

A user may begin this database migration by selecting a few options from a user interface, such as from a user interface provided by a web application or through use of an API. According to some configurations, the migration service 150 provides, to a user computing device 104, a display of user interface elements that allow the user to create a migration task. The migration task defines the set of information used by the migration service 150 to execute the migration. For instance, the user may provide connection information to the source and the target databases as well as set options to continue or stop the migration of changes after the data have been migrated. As an example, a user may provide user credentials such that the migration service 150 may perform operations involving the source database 121 and/or the target database 122. The user might also specify the network locations of where the source database and the target database are located. These options may also be specified via an API.

According to some configurations, the user may choose a computing resource in which the migration process will run. For example, the user may select (e.g., using a user interface or an API) a virtual machine instance (or, replication instance 129) that runs in the service provider network 110 that is to be used to perform the migration using functionality provided by the migration service 150. In some configurations, a migration manager of the migration service 150 may recommend a size for a virtual machine instance based on various performance criteria, such as the size of the data to migrate and how quickly the user wants the migration to occur. According to some examples, the user may select the size of virtual machine instance. Generally, the larger the size of the virtual machine instance, the more processing power the virtual machine instance has and the faster the migration occurs.

After the setup is complete, the user may begin the database migration by selecting a start option presented within a user interface or using functionality exposed by the API. In some examples, before the data migration is started, the migration service 150 may test the connections to the source and target databases using user-supplied connection information. According to some configurations, the migration service may create the replication instance 129 on a computing device. Once the migration has started, the replication instance 129, in conjunction with other entities of the migration service 150, manages the complexities of the migration process for the user.

In some configurations, the migration service 150 is used to perform data type transformations, and other operations while ensuring that data changes to the source database 121 that occur during the migration process are automatically migrated to the target database data 108.

After the initial database migration is complete and the data has been migrated to the target database 122, the migration service 150 may continue to migrate changes made to the source database 121 to the target database 122. For example, the user may specify during the creation of the migration task for the target database 122 to remain synchronized with the source database 121 for some period of time after the data has been migrated. This allows a user to switch applications from the source database to the target database at a convenient time, thereby reducing risk and minimizing any application downtime. In some cases, both databases may continue to be used by the user.

Figure 8:
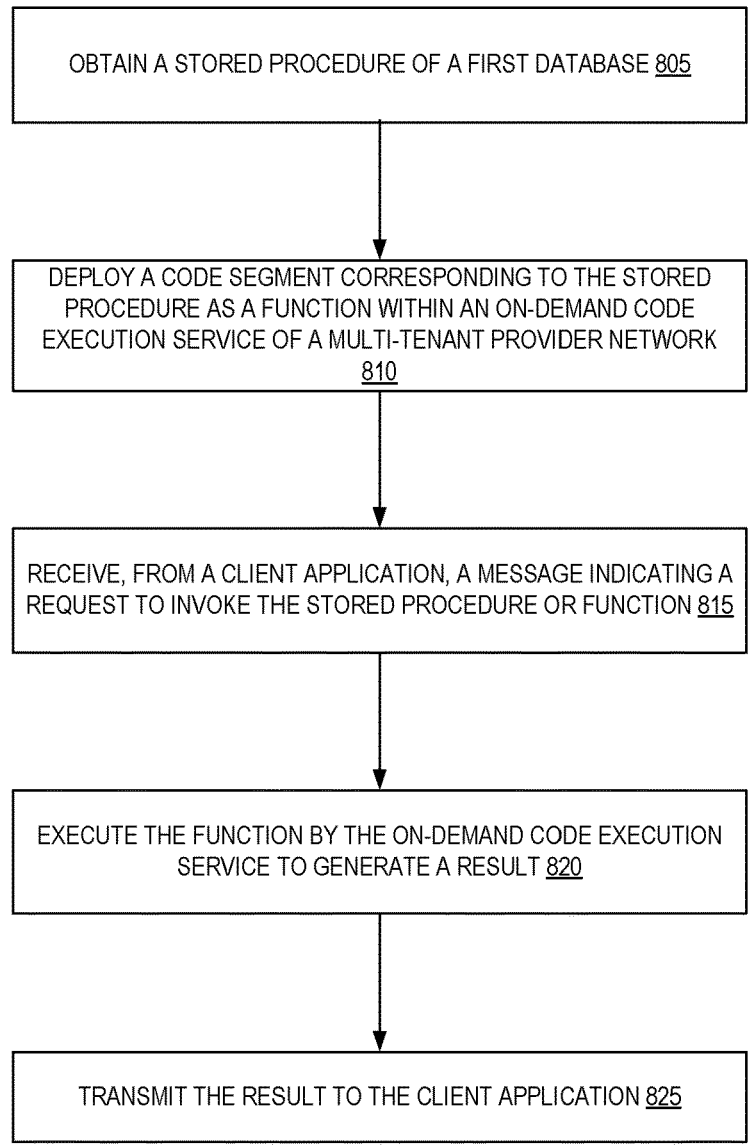
FIG. 8 is a flow diagram illustrating operations of a method for streamlined database migration with stored procedure extraction into on-demand execution environments according to some embodiments.

FIG. 8 is a flow diagram illustrating operations 800 of a method for streamlined database migration with stored procedure extraction into on-demand execution environments according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the migration service 150, database service(s) 110, and/or on-demand code execution service 142 of the other figures.

The operations 800 include, at block 805, obtaining a stored procedure of a first database;

In some embodiments, the first database is of a first type, and the operations further include migrating data of the first database to a second database, of a second type, within the multi-tenant provider network.

The operations 800 include, at block 810, deploying a code segment corresponding to the stored procedure as a function within an on-demand code execution service of a multi-tenant provider network.

At block 815, the operations 800 include receiving, from a client application, a message indicating a request to invoke the stored procedure or function.

In some embodiments, the client application comprises a database proxy implemented within the multi-tenant provider network; the database proxy is communicatively coupled between a second client application and the second database; and the database proxy sent the message responsive to the database proxy receiving, from the second client application, a command to invoke the stored procedure. In some embodiments, the operations further include identifying, by the database proxy, an identifier of the stored procedure within the command; obtaining, by the database proxy based at least in part on use of the identifier of the stored procedure, an identifier of a function of the on-demand code execution service, wherein the function corresponds to the code segment; sending, by the database proxy via use of the identifier of the function, the message indicating the request to execute the function; receiving, by the database proxy, the result; and transmitting a message to the second client application that includes the result.

In some embodiments, the message indicating the request to invoke the stored procedure or function comprises a HyperText Transport Protocol (HTTP) request message originated by the client application that was received at an endpoint associated with the on-demand code execution service.

The operations 800 include, at block 820, executing the function by the on-demand code execution service to generate a result.

In some embodiments, block 810 includes translating the stored procedure into the code segment, where the code segment comprises an intermediate representation of the stored procedure and block 820 includes interpreting the intermediate representation. In some embodiments, translating the stored procedure into the code segment comprises generating an abstract syntax tree based on the stored procedure, and parsing the abstract syntax tree.

The operations 800 include, at block 825, transmitting the result to the client application.

In some embodiments, the operations 800 further include presenting, via a client device of a user associated with the first database, one or more identifiers of one or more stored procedures detected within the first database, the one or more stored procedures including the stored procedure; and receiving, via the client device, an indication that a desired destination for the stored procedure is the on-demand code execution service.

In some embodiments, the operations 800 further include transmitting, to a client device of a user associated with the first database, an identifier associated with the function, wherein the request message includes the identifier associated with the function, wherein the identifier comprises a function name or a network address.

In some embodiments, the operations 800 further include obtaining a second stored procedure of the first database; translating the second stored procedure into a second code segment; and configuring the second database with a third stored procedure that utilizes the second code segment.

In some embodiments, the first database is external to the multi-tenant provider network; and the first type of the first database is different than the second type of the second database.

Figure 9:
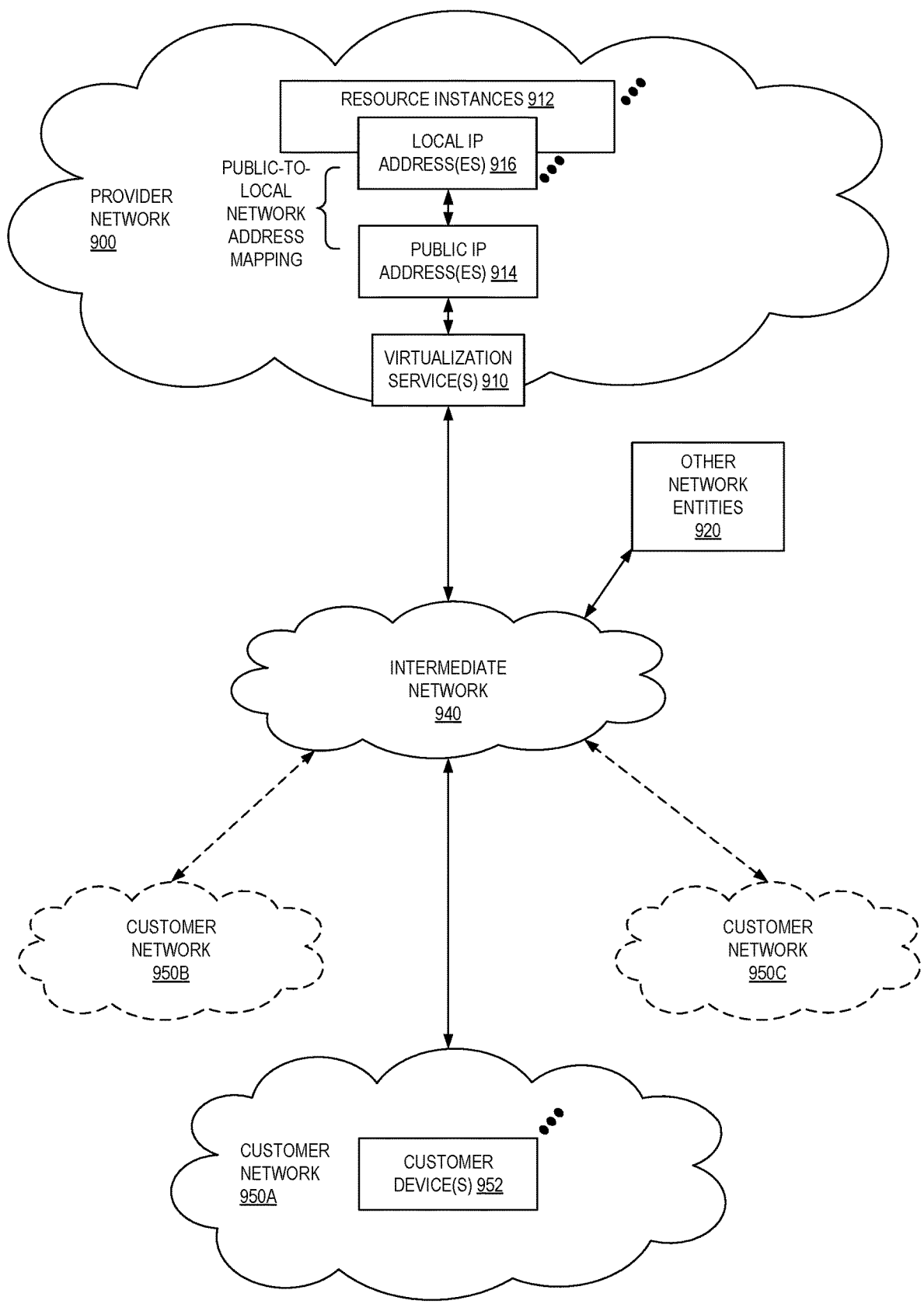
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local IP addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
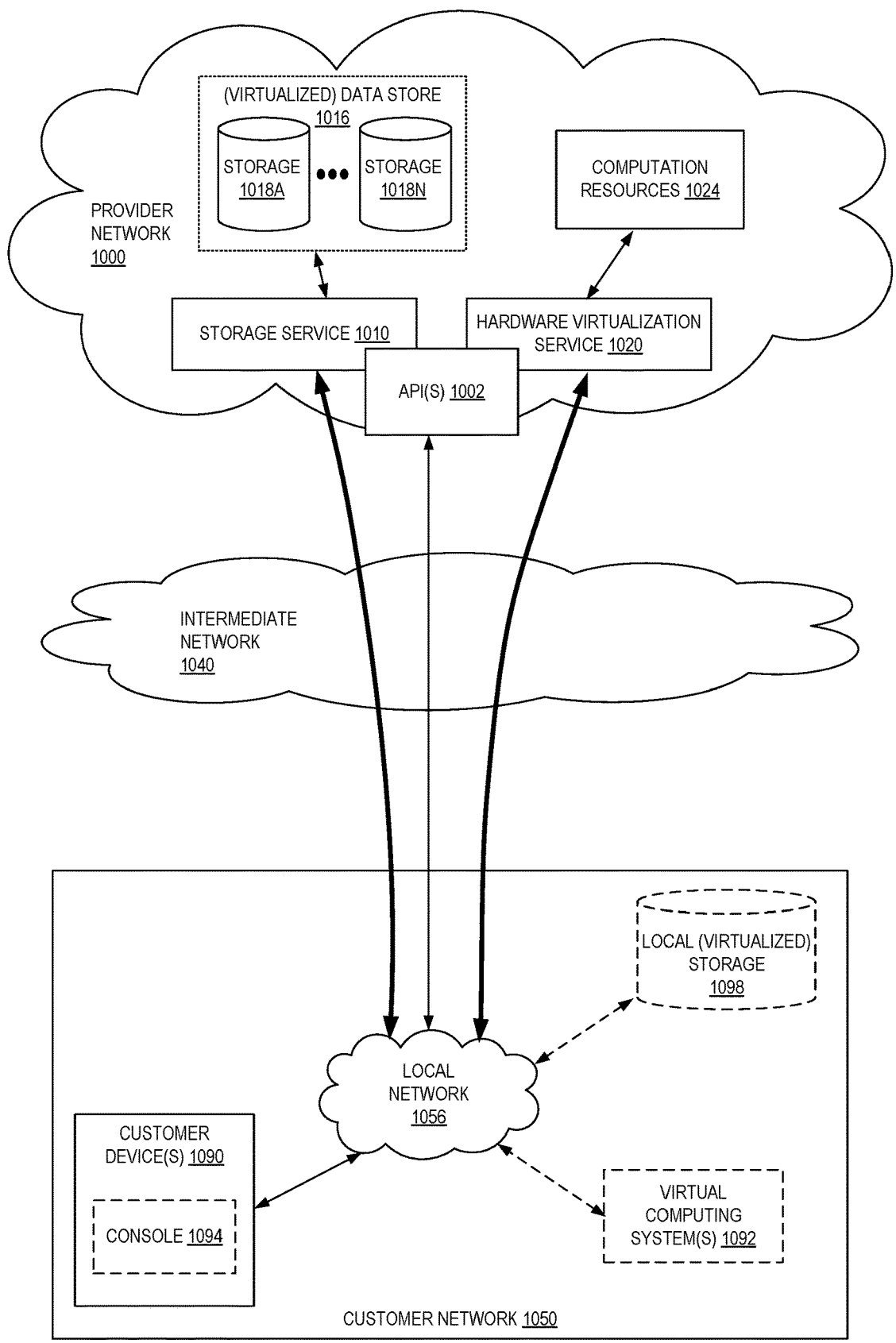
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative systems

Figure 11:
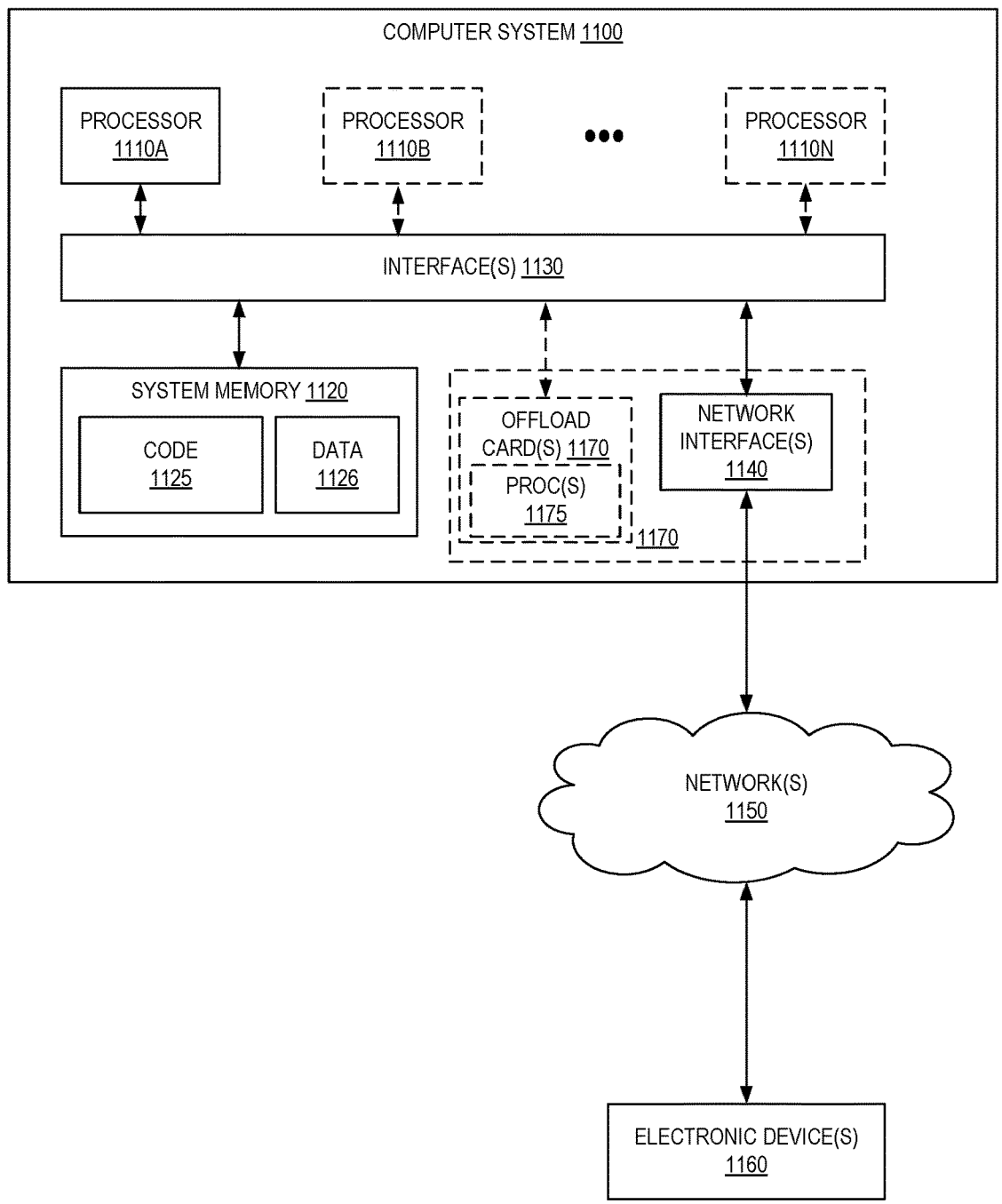
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, services, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and electronic devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   migrating a first database from a client network to a second database of a database service in a multi-tenant provider network, the migrating including:
      obtaining, by a migration service of the multi-tenant provider network, code for a first stored procedure of the first database;
   determining the stored procedure of the first database is not a candidate for migration to the second database of the database service in the multi-tenant provider network;
   based on the determining the stored procedure of the first database is not a candidate for migration to the second database:
      translating, by the migration service, the code for the first stored procedure of the first database into a code segment corresponding to the first stored procedure, wherein the code segment comprises an intermediate representation of the code for the first stored procedure; and
      causing, by the migration service, the code segment corresponding to the first stored procedure of the first database to be deployed as an executable function within an on-demand code execution service of the multi-tenant provider network, wherein the on-demand code execution service is separate from the database service of the multi-tenant provider network;
   receiving, by the on-demand code execution service from a database proxy implemented within the multi-tenant provider network, a message indicating a request to invoke the executable function of the on-demand code execution service, wherein the database proxy sent the message responsive to the database proxy receiving a command to invoke the stored procedure of the first database;
   executing, by the on-demand code execution service, the executable function of the on-demand code execution service to generate a result;
   transmitting the result to the database proxy;
   obtaining, by the migration service, code for a second stored procedure of the first database;
   translating, by the migration service, the code for the second stored procedure of the first database from a language supported by the first database into a third stored procedure in a language supported by the second database;
   causing, by the migration service, the third stored procedure to be configured within the second database that is based on the second stored procedure; and
   migrating data from the first database to the second database.

2. The computer-implemented method of claim 1, wherein:
   the database proxy is communicatively coupled between a client application and the second database; and
   the database proxy sent the message responsive to the database proxy receiving, from the client application, the command to invoke the stored procedure of the first database.

3. The computer-implemented method of claim 2, further comprising:
   identifying, by the database proxy, an identifier of the stored procedure of the first database within the command;

obtaining, by the database proxy based at least in part on use of the identifier of the stored procedure of the first database, an identifier of the executable function of the on-demand code execution service, wherein the executable function corresponds to the code segment;

sending, by the database proxy via use of the identifier of the executable function, the message indicating the request to execute the executable function of the on-demand code execution service;

receiving, by the database proxy, the result; and transmitting a message to the client application that includes the result.

4. A computer-implemented method comprising:

obtaining code for a stored procedure of a first database;

determining the stored procedure of the first database is not a candidate for migration to a second database of a database service of a multi-tenant provider network;

based on the determining the stored procedure of the first database is not a candidate for migration to the second database:

translating the code for the stored procedure of the first database into a code segment corresponding to the stored procedure of the first database; and deploying the code segment corresponding to the stored procedure of the first database as an executable function within an on-demand code execution service of the multi-tenant provider network, wherein the on-demand code execution service is separate from the database service of the multi-tenant provider network;

receiving, by the on-demand code execution service from a database proxy implemented within the multi-tenant provider network, a message indicating a request to invoke the executable function of the on-demand code execution service, wherein the database proxy sent the message responsive to the database proxy receiving a command to invoke the stored procedure of the first database;

executing, by the on-demand code execution service, the executable function of the on-demand code execution service to generate a result; and transmitting the result to the database proxy.

5. The computer-implemented method of claim 4, wherein the first database is of a first type, and wherein the method further comprises migrating data of the first database to a second database, of a second type, within the multi-tenant provider network.

6. The computer-implemented method of claim 5, wherein:

the database proxy is communicatively coupled between a client application and the second database; and the database proxy sent the message responsive to the database proxy receiving, from the client application, the command to invoke the stored procedure of the first database.

7. The computer-implemented method of claim 6, further comprising:

identifying, by the database proxy, an identifier of the stored procedure of the first database within the command;

obtaining, by the database proxy based at least in part on use of the identifier of the stored procedure of the first database, an identifier of the executable function of the on-demand code execution service, wherein the executable function corresponds to the code segment;

sending, by the database proxy via use of the identifier of the executable function, the message indicating the request to execute the executable function of the on-demand code execution service;

receiving, by the database proxy, the result; and transmitting a message to the client application that includes the result.

8. The computer-implemented method of claim 4, wherein:

the code segment comprises an intermediate representation of the stored procedure; and executing the executable function comprises interpreting the intermediate representation of the stored procedure.

9. The computer-implemented method of claim 8, wherein translating the stored procedure into the code segment comprises:

generating an abstract syntax tree based on the stored procedure; and parsing the abstract syntax tree.

10. The computer-implemented method of claim 4, further comprising:

presenting, via a client device of a user associated with the first database, one or more identifiers of one or more stored procedures detected within the first database, the one or more stored procedures including the stored procedure; and receiving, via the client device, an indication that a desired destination for the stored procedure is the on-demand code execution service.

11. The computer-implemented method of claim 4, wherein the message indicating the request to invoke the stored procedure or executable function comprises a HyperText Transport Protocol (HTTP) request message originated by the client application that was received at an endpoint associated with the on-demand code execution service.

12. The computer-implemented method of claim 11, further comprising:

transmitting, to a client device of a user associated with the first database, an identifier associated with the executable function, wherein the request message includes the identifier associated with the executable function, wherein the identifier comprises a function name or a network address.

13. The computer-implemented method of claim 5, further comprising:

obtaining a second stored procedure of the first database; and determining a confidence value indicating a predicted likelihood that the second stored procedure can be successfully translated for use or directly used by the second database.

14. The computer-implemented method of claim 13, further comprising:

determining that the confidence value satisfies a condition;

translating the second stored procedure into a second code segment; and configuring the second database with a third stored procedure that utilizes the second code segment.

15. A system comprising:

a first one or more electronic devices including one or more first processors and first memory, and implementing a database service in a multi-tenant provider network;

a second one or more electronic devices including one or more second processors and second memory, and implementing a database migration service in the multi-tenant provider network, the database migration service including a first set of instructions stored in the second memory that, upon execution by the one or more second processors, cause the database migration service to:
obtain code for a stored procedure of a first database located outside of the multi-tenant provider network;
determine the stored procedure of the first database is not a candidate for migration to a second database of a database service of the multi-tenant provider network;
based on the determining the stored procedure of the first database is not a candidate for migration to the second database:
translate the code for the stored procedure of the first database into a code segment corresponding to the stored procedure of the first database; and
deploy the code segment corresponding to the stored procedure of the first database as an executable function within an on-demand code execution service of the multi-tenant provider network, wherein the on-demand code execution service is separate from the database service of the multi-tenant provider network; and
cause data of the first database to be migrated to the second database; and
a third one or more electronic devices including one or more third processors and third memory, and implementing the on-demand code execution service of the multi-tenant provider network, the on-demand code execution service including a second set of instructions stored in the third memory that, upon execution by the one or more third processors, cause the on-demand code execution service to:
receive, from a database proxy implemented within the multi-tenant provider network, a message indicating a request to invoke the executable function of the on-demand code execution service, wherein the database proxy sent the message responsive to the database proxy receiving a command to invoke the stored procedure of the first database;
execute the executable function of the on-demand code execution service to generate a result, the execution including utilizing the second database; and
transmit a message indicating the result to the database proxy.

16. The system of claim 15, further comprising a fourth one or more electronic devices implementing the database proxy, the database proxy including one or more fourth processors and fourth memory storing a third set of instructions that, upon execution by the one or more fourth processors, cause the database proxy to:
receive, over a connection with a client application, the command to invoke the stored procedure of the first database;
send the message indicating the request to invoke the executable function of the on-demand code execution service;
receive the message indicating the result; and
send, over the connection with the client application, a response indicating the result.

17. The system of claim 16, wherein the third set of instructions comprises further instructions that, upon execution by the one or more fourth processors, further cause the database proxy to:
receive, over the connection with the client application, a query to be executed by the second database; and
send the query to the second database.

18. The system of claim 15, wherein the code segment comprises an intermediate representation of the stored procedure.

19. The system of claim 18, wherein the execution of the executable function comprises interpreting the intermediate representation of the stored procedure.

20. The system of claim 15, wherein the first set of instructions comprises further instructions that, upon execution by the one or more second processors, further cause the database migration service to:
obtain code for a second stored procedure of the first database;
determine that a confidence value indicating a predicted likelihood that the second stored procedure can be successfully translated for use or directly used by the second database satisfies a condition;
cause the second stored procedure to be converted into a third stored procedure that is of a format supported by the second database; and
cause the third stored procedure to be configured within the second database.

* * * * *